May 8, 1951        H. J. FINDLEY        2,551,662
ENGINE COOLING TEMPERATURE CONTROL
Filed March 12, 1947
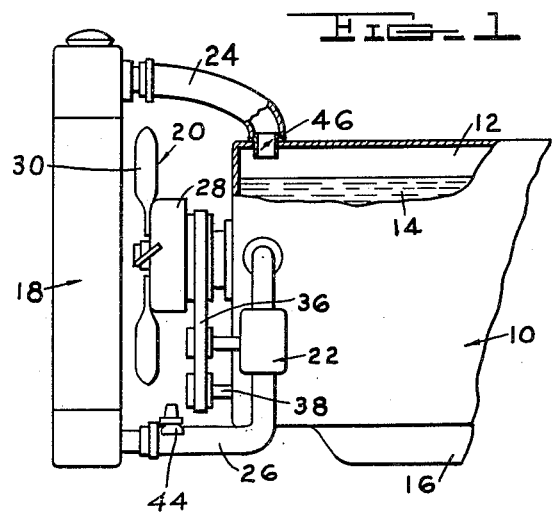
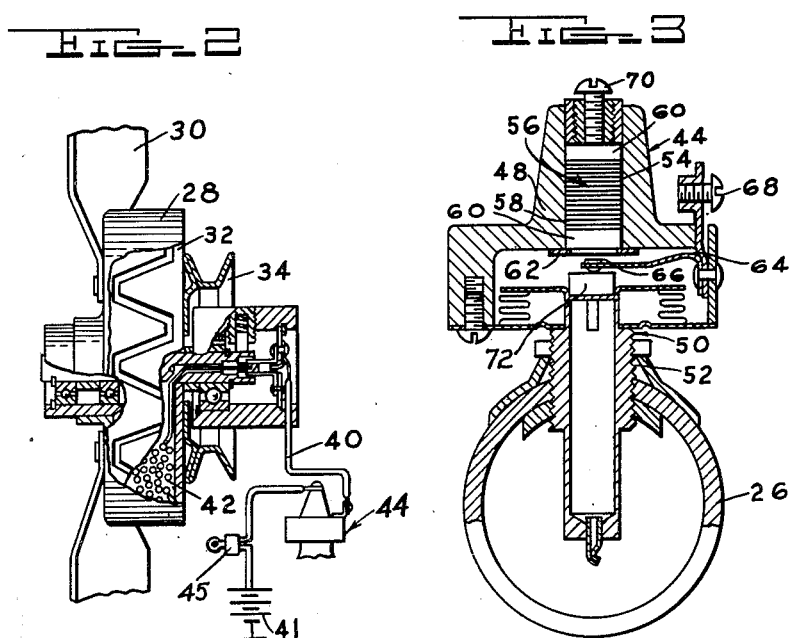
INVENTOR.
HOWARD J. FINDLEY
BY
McDonald & Teagno
ATTORNEYS Patented May 8, 1951

2,551,662

UNITED STATES PATENT OFFICE 2,551,662

ENGINE COOLING TEMPERATURE CONTROL

Howard J. Findley, Chardon, Ohio, assignor to Eaton Manufacturing Company, Cleveland, Ohio, a corporation of Ohio Application March 12, 1947, Serial No. 734,085

13 Claims. (Cl. 123—41.12)

This invention relates to an engine cooling temperature control for internal combustion engines and more particularly to means associated therewith providing for the effective operation thereof.

Broadly the invention comprehends an engine cooling apparatus for internal combustion engines comprising an engine cooling fan driven through the medium of an eddy current electromagnetic drive from an output shaft of the engine. The fan operation is controlled by a thermostatically actuated variable resistance switch located in the liquid conduit providing communication between the discharge from the engine cooling radiator and the intake to the engine.

An object of the invention is the provision of an engine cooling apparatus for internal combustion engines having control means therefor effective to provide for more efficient engine operation, wherein the engine cooling fan is operated only at times when the other components of the cooling apparatus are inadequate to properly cool the engine and at required capacity only.

Another object of the invention is the provision of an engine cooling fan comprising an element of an engine cooling apparatus for internal combustion engines that is driven by an eddy current electromagnetic drive from an output shaft of the engine, said drive being controlled by thermostatically actuated variable resistance means, in the form of a carbon pile resistance, arranged in the liquid circulatory cooling system of the engine effective to provide for the operation of the fan in accordance with the predetermined engine operating requirements.

A further object of the invention is the provision of an engine cooling fan drive means having a thermostatic control therefor in the form of a carbon pile voltage regulator effective to provide for an automatic controlled rheostatic operation of the fan drive in accordance with temperature changes of the liquid in the circulatory cooling system of the engine with which the fan is to be associated.

A yet further object of the invention is the provision of a thermostatically operated carbon pile voltage regulator as a means for regulating an electromagnetically driven fan of an engine cooling apparatus effective to provide for the controlled supply of current to the electromagnetic coil of the drive for the rheostatic operation of the fan in accordance with the the temperature to which the regulator is subjected.

A still further object of the invention is the provision of an engine cooling fan, comprising a component part of an engine cooling apparatus for internal combustion engines, that is driven by an eddy current electromagnetic drive from an output shaft of the engine, said drive being controlled by a thermostatically actuated variable resistance switch suitably arranged in the liquid circulatory cooling system of the engine between the discharge from the engine cooling radiator and the intake to the engine block effective to provide for the operation of the fan only when the other components of the cooling apparatus are inadequate to properly cool the engine and then only at the minimum speed required for effective cooling of the engine, thereby effecting improved engine performance and economy through fuel oil, and horsepower saving, reduction in crankcase dilution, sludging; engine wear, and engine noise and quicker engine warm up.

Other objects and advantages of the invention will appear from the following description taken in connection with the drawings, forming a part of the specification; and in which:

Fig. 1 is a diagrammatic illustration of a novel form of an engine cooling apparatus constituting the instant invention, as applied to a conventional internal combustion engine;

Fig. 2 is an enlarged fragmentary partially sectionalized view of an electromagnetically driven engine cooling fan incorporated in the cooling apparatus; and Fig. 3 is an enlarged vertical sectional view of a thermostatically operated carbon pile voltage regulator for the fan.

Although the problem of engine cooling and the provision of means for accomplishing same seems simple, the resultant ill effect of improper cooling and control thereof of internal combustion engines is serious especially with regards to the high rate of crankcase dilution and sludging or the like that occurs through the operation of engines below proper operating temperatures. Furthermore, in the normal operation of engine cooling fans of a conventional engine cooling apparatus for internal combustion engines wherein the fan is driven constantly in accordance with engine operation, the fan is at times needlessly driven and at capacities beyond engine cooling requirements thereby causing unnecessary unfavorable engine operating conditions. The present invention was devised as a means for improving the efficiency of internal combustion engine cooling systems through the provision of an eddy current electromagnetically driven engine cooling fan that is controlled for operation by a thermostatically actuated variable resistance voltage regulator, said regulator being responsive to the temperature of the fluid circulated through an associated engine and its cooling system, including a water pump and radiator, at a point in the system intermediate the discharge from the radiator and the inlet to the engine. By so arranging the thermostatic actuated variable resistance switch for controlling the fan operation at the point in the system where the liquid is the coldest after its circulation through the engine cooling radiator, it is possible to set said thermostatic switch for operation at say, for example, about 145° F. thus permitting an over-all rise in the temperature in the engine, conduits, and radiator before the engine cooling fan is placed in operation, that is, the fan will not be required to be driven until the effectiveness of the circulating pump and radiator are insufficient for ample cooling of the engine. It will be evident with this arrangement of electromagnetically driven cooling fan and thermostatically actuated variable resistance voltage regulator that as the temperature of the liquid through which the thermostatic switch is subjected increases say to above 160° F. that more current will be supplied to the fan drive means, thereby providing for the increased speed of operation thereof comparably to the output means of the engine from which the fan is driven. With the setting of the thermostatic controlled voltage regulator for the initial operation of the fan say at about 145° F. and a water flow controlled thermostat arranged in the outlet of the engine for operation say at about 180° F., it will be possible to maintain the heat of the cooling liquid throughout the cooling system at a fairly uniform temperature thus improving the over-all operating efficiency of the engine.

The effective controlled operation of the fan in accordance with cooling requirements improves engine efficiency in that a saving in fuel consumption and horsepower is had because under normal operating conditions of a vehicle employing an internal combustion engine the fan operates only a small fraction of the engine operating time; and when it operates, it only runs at a speed necessary to keep the engine at the precise operating temperature required and only seldomly will the power requirements for the fan except under extreme conditions be equivalent to a conventional direct engine driven fan; and quicker warm-up of the engine, especially in winter time, is obtained because with the fan off no cold blast of air is passed over the engine, retarding engine warm-up thereby also effectively adding materially to the faster supply of hot water to hot water heaters associated with the engine. Due to the faster warm-up of the engine, oil sludging and crankcase dilution are reduced and less necessity for checking of the engine is required. As a direct result of reduction in sludging and crankcase dilution a material oil saving is made and a reduction in wear of the engine is secured. Because of the fact that engine fan operation attributes a considerable amount of the noise apparent in engine operation, the limited and controlled operation thereof as herein devised eliminates a considerable amount of this annoyance thereby providing greater driving pleasure to the vehicle driver and passengers.

The thermostatically actuated variable resistance voltage regulators herein specifically shown for use in connection with a conventional liquid cooled internal combustion engine is in the form of a methyl alcohol or similar expanding liquid contained bellows arranged in cooperation with a variable resistance carbon pile for the purpose of affording effective means for the rheostatic operation of the eddy current drive associated with the fan in accordance with the temperature variations in the engine cooling system.

It is apparent that the aforesaid described fan drive and controls are applicable to both air and liquid cooled internal combustion engines in that the variable resistance voltage regulator and the thermostatic actuating means therefor would be suitably located such that they would not effect operation of the engine until such time that the other components of the cooling system are inadequate to properly cool the engine, that is the conventional radiator and water pump in association with a liquid cooling system and the proper air cooling ducting associated with air cooled systems.

Referring to the drawings for more specific details of the invention, 10 represents generally a conventional internal combustion liquid cooled engine comprising a cylinder head portion 12, block 14, and crankcase 16 and having arranged in association therewith a cooling radiator 18, a cooling fan 20, and a liquid circulatory pump 22.

The radiator 18 is connected into the liquid circulatory system of the engine by conduits 24 and 26, conduit 24 providing communication between the discharge of the cylinder head and entrance to the radiator whereby conduit 26 provides communication between discharge from the radiator and inlet to the cylinder block. The pump 22 is arranged as shown by Fig. 1 in the conduit 24 although it might equally effectively be located at numerous other points in the cooling system.

The cooling fan 20 is of the eddy current electromagnetically controlled engine driven type more fully described by my copending application Serial No. 693,492 comprising an output member 28 upon which fan blades 30 are radially mounted and rigidly secured and an input member 22 driven through pulley 34 by way of V-belt 36 coupling a driven output shaft 38 of the engine thereto for the driving thereof. The pump 22 similarly to member 32 is driven from shaft 38 by belt 36. The fan is conventionally arranged intermediate the radiator and engine to provide for the proper cooling of the liquid in the engine in accordance with predetermined requirements.

Electrical current for the operation of the fan is supplied through electrical circuit 40 from power source such as storage battery 41 to an electromagnetic coil 42 associated with the member 32 providing for the creation of eddy currents in the output member 28 and the provision of driving relationship between members 28 and 32.

As a means for effectively controlling operation of the fan 20 in accordance with the cooling requirements of the engine, a thermostatically responsive voltage regulator 44 is arranged in the conduit 26 having electrical connection in the circuit 40 as shown by Fig. 2.

Through the employment of regulator 44, an automatic rheostatic control of fan 20 is provided such that upon a predetermined temperature setting the regulator is initially operable to supply a small amount of current to the coil 42 so as to effect a small drag between members 28 and 32 and consequent slow rotation of the fan blades 30 relative to the speed imparted to member 32 from the engine output shaft 38. With an increase of temperature of liquid circulated through conduit 26 from the radiator 18 above the predetermined initial temperature setting of regulator 44, a greater supply of current is furnished the coil 42 resulting in increasing the flow of eddy currents in member 28 and thus decreasing the differential of speed between members 28 and 32. When the temperature reaches a predetermined maximum setting of the regulator in conduit 26, the regulator reacts to so provide for full energization of coil 42 resulting in providing for rotation of the fan comparable to the speed of input member 32. The energizing circuit 40 may also include a key controlled switch 45 such as the conventional ignition switch of an engine.

A conventional liquid flow control thermostat 46 is arranged in the engine cylinder head 12 at a point near the liquid discharge therefrom effective to control the flow of liquid from the circulatory system of the engine. The thermostat 46 is made responsive to the temperature at which it is desired to permit continuous circulation of liquid through the engine block, cylinder radiator and conduits through the pumping action of pump 22.

Through the combined action of regulator 44 and thermostat 46, it is possible to effect a more uniform and higher operating temperature of the engine.

The regulator 44 effective to provide for the rheostatic control and supply of current to the coil 42 for the automatic regulated operation of the fan 20 as shown specifically by Fig. 3 is of the carbon pile variety and includes a case 48 having arranged in one end thereof a bulb and bellows assembly 50 wherein the bulb portion thereof is adapted to be inserted in conduit 26 and held therein by clamping fixture 52 provided cooperatively between the valve and conduit 26. The bulb and bellows are adapted to be filled with an expansible liquid such as methyl alcohol effective upon a change of temperature in conduit 26 to move the bellows axially relative to the bulb and case.

The case 48 has arranged in a bore 54 thereof axially aligned with the bulb and bellows assembly carbon pile 56 comprising a plurality of carbon disks 58 normally held in the bore in loosely packed array. Carbon terminal plugs 60 are arranged at the opposite ends of the carbon pile 56, the purpose of which will hereinafter appear, and a supporting member 62 for preloading the carbon disks to a predetermined value fixedly secured to the case retains the carbon pile and plugs in the bore 54.

A contact arm 64 having a contact point 66 at the extremity of the free end thereof is supported on the case 48 and extends radially therefrom with the contact point 66 aligned axially with the bulb and bellows assembly and carbon pile and being effective upon the movement of the bellows toward the carbon pile to contact plug 60 and thus provide for the flow of current through the contact arm, contact point, and carbon pile from an electrical current terminal 68 connected to arm 64 upon the case 48 and an electrical current terminal 70 contacting the terminal plug 60 at the end of the carbon pile opposite from the contact point 66. The bellows has arranged concentrically exteriorly thereon a contact insulator 72 which normally engages the other side of contact point 66 of contact arm 64.

The regulator 44 is set for initial operation in accordance with predetermined requirements say, for example, at 145° F. such that as shown by Fig. 3 the contact point 66 which is normally spaced from contact with terminal plug 60 adjacent support 62 is not actuated to contacting relation with said plug 60 until the coolant liquid in the conduit 26 obtains a temperature of 145° F. whereupon the expansible liquid in the bulb and bellows expands effecting an expansion of the bellows resulting in moving contact point 66 against the plug 60 effective to move the carbon disks 58 in closer packed relation to one another thereby reducing the resistance to current flow through the carbon pile 56. The regulator 44 is electrically non-conductive with the exception of the terminal 68 and 70, carbon terminal plug 60, and contact arm and point 64 and 66 respectively.

With the initial contact of point 66 against terminal plug 60 a flow of current is supplied through the carbon pile in accordance with the packed-up relation of the carbon disks and the resistance they offer to current flow effective to supply current to coil 42 from battery 41 and cause rotation of the member 28 in accordance with the current supply and rotative speed of member 32 derived from driving relation with engine shaft 38.

As the heat of the liquid coolant and conduit 26 increases due to increased engine operating temperature the methyl alcohol in the bulb and bellows expands further causing further axial movement of the bellows and the increased compression of the carbon disks 58 whereby the resistance to current flow is reduced and more current is supplied to coil 42 effective to provide for the driving of member 28 relative to member 32 with a reduction in speed differential therebetween.

It is obvious from the operation of regulator 44 that an automatic rheostatic control of the fan operation is obtained in that the fan will be operated in accordance with the demand placed upon it as determined by the temperature of the liquid in conduit 26 such that at low operating temperatures of the engine and liquid coolant in the cooling system the regulator wil be inoperative and the fan likewise will not operate and vice versa when the engine and liquid coolant in the cooling system are operating at high temperatures, the regulator will operate upon the movement of the bellows, contact arm, contact point, and carbon pile to maximum pack-up condition to effect the flow of the maximum amount of current to the coil thereby providing for the transmission of power to the member 28 from member 32 effective to rotate the fan comparably to member 32.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. In combination with a fluid cooled internal combustion engine, a cooling apparatus comprising a fluid circulatory system associated with the engine and an engine cooling fan, an engine driven eddy current electromagnetic drive for coupling an output shaft of the engine with the fan, an electric circuit for energizing the drive, and a thermostatically actuated variable resistance voltage regulator positioned at substantially the coolest point of the circulatory system for controlling energization of the electromagnetic drive.

2. In combination with a fluid cooled internal combustion engine, a cooling apparatus comprising a fluid circulatory system associated with the engine and an engine cooling fan, an engine driven eddy current electromagnetic drive for coupling an output shaft of the engine with the fan, an electric circuit for energizing the drive, and a temperature responsive variable resistance voltage regulator positioned at a point in the circulatory system wherein the regulator will not be actuated for the purpose of energizing the drive for fan operation until increased fluid cooling is required over and above normal fluid cooling in the circulatory system.

3. A cooling apparatus for a liquid cooled internal combustion engine comprising a radiator having inlet and outlet conduits connected to the engine, an eddy current electromagnetically operated engine cooling fan driven from a power output shaft of the engine, and a variable resistance thermostatically responsive switch in the outlet conduit of the radiator for controlling the operation of the fan.

4. An engine cooling apparatus for a liquid cooled engine comprising a cooling radiator arranged in communication in the liquid cooling circulatory system of the engine, an engine cooling fan, an engine driven eddy current electromagnetic drive for driving the fan, an electric circuit for energizing the drive and a thermostatically actuated variable resistance switch located in substantially the coolest portion of the circulatory system for controlling the energization of the eddy current drive and fan driven thereby over a variable range of engine temperatures.

5. In combination with a liquid cooled internal combustion engine, a cooling apparatus comprising a radiator having inlet and outlet communications with the liquid circulatory system of the engine, an engine cooling fan, an engine driven eddy current electromagnetic drive for coupling an output shaft of the engine with the fan, an electric circuit for energizing the drive, and a thermostatically actuated carbon pile switch including a thermally expansible element positioned in the circulatory system of the engine at the outlet from the radiator for rheostatically controlling the energization of the eddy current drive.

6. In combination with a liquid cooled internal combustion engine, a cooling apparatus comprising a radiator having inlet and outlet communications with the liquid circulatory system of the engine, an engine cooling fan, an engine driven eddy current electromagnetic drive for coupling an output shaft of the engine with the fan, an electric circuit for energizing the coupling, and a thermostatically actuated variable resistance switch positioned in the outlet communication of the radiator with the circulatory system of the engine for rheostatically controlling the energization of the eddy current drive.

7. In combination with a liquid cooled internal combustion engine having a liquid circulatory system, a cooling apparatus comprising a radiator having outlet and inlet conduits arranged in communication with the circulatory system of the engine, an eddy current electromagnetic drive driven from the engine including an input member, an output member operatively arranged therewith, and an electromagnetic coil carried by one of the members, an engine cooling fan driven by the drive, an electric circuit for energizing the coil, and a thermostatically operated variable resistance voltage regulator positioned in the outlet conduit of the radiator actuated by the temperature of the liquid circulated therethrough for controlling the energization of the electromagnetic coil.

8. In combination with a liquid cooled internal combustion engine having a liquid circulatory system, a cooling apparatus comprising a cooling radiator having inlet and outlet conduits communicating with the engine circulatory system, an eddy current electromagnetically operated engine cooling fan having driving connection with the engine, a liquid circulating pump incorporated in the circulatory system, and a thermostatically actuated variable resistance switch arranged in the radiator outlet for controlling the operation of the fan.

9. In combination with a liquid cooled internal combustion engine having a liquid circulatory system, a cooling apparatus comprising a cooling radiator having inlet and outlet conduits communicating with the engine circulatory system, an eddy current electromagnetically operated engine circulatory cooling fan having driving connection with the engine, a liquid flow control thermostat arranged in the circulatory system intermediate the inlet to the radiator and inlet from the engine, an electric circuit for energizing the fan operating means, and a thermostatically actuated variable resistance voltage regulator positioned substantially at the outlet from the radiator for controlling the operation of the fan by rheostatically controlling the energization of the fan operating means.

10. A thermostatically operable carbon pile switch adaptable to be positioned in the cooling liquid circulating system of a motor vehicle for controlling the operations of an eddy current electromagnetically operated engine cooling fan comprising a housing, a compressible carbon pile resistor mounted in one end of the housing, a thermally responsive bellows on the other end of the housing adapted to be inserted in the circulating system, and a movable contact positioned intermediate the bellows and carbon pile adapted to be moved by the bellows and thus become engageable with the carbon pile.

11. A switch for controlling the operation of an eddy current electromagnetically operated engine cooling fan comprising a housing, a thermally expansible bulb and bellows mounted on one end of the housing, a tension pre-loaded compressible carbon pile resistor mounted in the other end of the housing having a current terminal on one end thereof, and a movable electrical current conducting contact arranged intermediate the bellows and the free end of the carbon pile resistor, said contact abutting the free end of the carbon pile resistor effective to compress same upon the expansion of the bellows.

12. A cooling apparatus for a liquid cooling internal combustion engine comprising a radiator forming a part of the liquid circulating system of the engine having inlet and outlet conduits connected to the engine, an electromagnetically actuated cooling fan driven from a power output shaft of the engine, and a thermostatically responsive switch in the outlet conduit of the radiator for controlling the operation of the fan over a variable range of engine speeds and temperature.

13. In combination with an internal combustion engine having a cooling system, a cooling apparatus comprising an air impelling fan, an engine driven variable speed output controllable electromagnetic drive for coupling an output shaft of the engine with the fan, an electric circuit for energizing the drive and a thermostatically actuated variable resistance voltage regulator positioned in substantially the coolest portion of the cooling system for controlling the energization of the drive.

HOWARD J. FINDLEY.

REFERENCES CITED

The following references are of record in the file of this patent:

UNITED STATES PATENTS

| Number | Name | Date |
|---|---|---|
| 1,335,238 | Hopkins | Mar. 30, 1920 |
| 1,481,306 | Stuart | Jan. 22, 1924 |
| 1,481,307 | Stuart | Jan. 22, 1924 |
| 1,695,295 | Rollins | Dec. 18, 1928 |
| 1,820,091 | Reavis | Aug. 25, 1931 |
| 1,921,042 | Roos | Aug. 8, 1933 |
| 1,934,783 | Arterburn | Nov. 14, 1933 |
| 2,341,789 | Justus | Feb. 15, 1944 |
| 2,396,000 | Findley | Mar. 5, 1946 |